United States Patent [19]

Jeffery et al.

[11] 4,045,583

[45] Aug. 30, 1977

[54] METHOD OF MANUFACTURING A CHOCOLATE PRODUCT

[75] Inventors: Maurice Stanley Jeffery, Solihull; Paul Anthony Glynn, Birmingham; Mohammed Moiz Uddin Khan, Solihull, all of England

[73] Assignee: Cadbury Limited, Birmingham, England

[21] Appl. No.: 705,207

[22] Filed: July 14, 1976

[30] Foreign Application Priority Data

July 22, 1975 United Kingdom .............. 30570/75

[51] Int. Cl.$^2$ .............................................. A23G 1/00
[52] U.S. Cl. ...................... 426/241; 426/98; 426/103; 426/242; 426/445; 426/515; 426/631; 426/660
[58] Field of Search ............... 426/98, 456, 99, 470, 426/93, 45, 103, 631, 306, 281, 285, 564, 572, 584, 602, 613, 660, 517, 515, 242, 241, 96, 104, 445, 465

[56] References Cited

U.S. PATENT DOCUMENTS

| | | | |
|---|---|---|---|
| 2,278,466 | 4/1942 | Musher | 426/103 X |
| 2,287,838 | 6/1942 | Stanley | 426/613 |
| 2,457,110 | 12/1948 | Russell et al. | 426/306 |
| 2,694,643 | 11/1954 | Robinson et al. | 426/98 |
| 3,407,080 | 10/1968 | Rainwater et al. | 426/285 X |
| 3,617,302 | 11/1971 | Collins | 426/98 X |
| 3,622,342 | 11/1971 | Rusoff | 426/660 X |
| 3,702,252 | 11/1972 | Veltman et al. | 426/584 |
| 3,719,497 | 3/1973 | Galle et al. | 426/98 X |
| 3,745,022 | 7/1973 | Broeg et al. | 426/660 |
| 3,769,030 | 10/1973 | Kleinert | 426/660 X |
| 3,779,772 | 12/1973 | Forkner | 426/285 X |
| 3,851,083 | 11/1974 | Brooking et al. | 426/98 X |
| 3,914,439 | 10/1975 | Graves | 426/98 X |
| 3,971,852 | 7/1976 | Brenner et al. | 426/103 |
| 3,978,236 | 8/1976 | Sair et al. | 426/445 |

FOREIGN PATENT DOCUMENTS

688,859   6/1964   Canada .............................. 426/613

OTHER PUBLICATIONS

Williams; "Chocolate and Confectionary"; Leonard Hill Book Ltd., 9 Eden St., N. W. London; 1956; p. 85.

*Primary Examiner*—S. Leon Bashore
*Assistant Examiner*—Kenneth M. Schor
*Attorney, Agent, or Firm*—Ladas, Parry, Von Gehr, Goldsmith & Deschamps

[57] ABSTRACT

A method of manufacturing an expanded temperature-resistant, chocolate product, comprises mixing intimately water, at least one edible fat, sugar and an emulsifier to produce an emulsion of said fat with an aqueous sugar solution. The solution is then evaporated to about 10% moisture content while maintaining the fat in emulsion. Finally, the mixture is dried, preferably under reduced pressure, with gasification to produce an expanded product containing 15-35% fat, at least 40% sugar and not more than 5%, preferably not more than 2%, water. The product contains individual fat particles which are separated from one another in a sugar glass so that fat seepage from the product at elevated ambient temperatures is obviated.

11 Claims, No Drawings

METHOD OF MANUFACTURING A CHOCOLATE PRODUCT

This invention relates to a shaped heat-resistant chocolate product and to a method of manufacturing same.

Chocolate and chocolate flavoured products, when conventionally produced, consists of sugar crystals and cocoa particles dispersed through a fat phase which, in the case of dark chocolate, is principally cocoa butter and, in the case of milk chocolate, consists of dairy butter and cocoa butter. Milk chocolate normally contains 42% by weight of sugar, 30% by weight of fat, and 28% by weight of milk solids. The advantage of such chocolate is that it is a material which melts readily in the mouth, thus quickly releasing its characteristically pleasant flavour. However, it is a disadvantage of such chocolate that it is sensitive to heat, and temperatures above the melting point of the fat causes the chocolate to melt and flow. This means that such chocolate is difficult to handle, particularly where ambient temperatures are relatively high. The heat of the hand can melt such chocolate thus making it inconvenient to handle.

It has previously been proposed to prepare a heat resistant chocolate which consists of a sugar structure in which fatty substances are incorporated. Such a preparation process, however, involves the preparation of a first mass containing sugar in a predominantly amorphous form and mixing, at a temperature not exceeding 35°–40° C, the first mass with a second mass of conched chocolate containing sugar in a crystallised form. After moulding and packing in a hermetic wrapper, the product is then heat treated by keeping it at a constant temperature between 20° and 35° C for a period of 10 to 60 days during which time a sugar skeleton or edifice forms within the chocolate product to impart a heat resistance thereto. This is still a continuous fat phase chocolate with conventional appearance.

A disadvantage of such a process is that it involves the production of two different masses which involves the use of two different types of equipment. Another disadvantage of such a process is that it involves a lengthy heat treatment at a carefully controlled temperature before the heat resistance is fully developed.

A disadvantage of the product of such a process is that although it possesses a certain amount of heat resistance, fat melting occurs at elevated ambient temperatures even though the overall structure of the product does not disintegrate as occurs with conventional chocolate products.

An object of the present invention is to provide an improved, heat resistant chocolate product and an improved process for preparing such a product in which the above disadvantages are obviated or mitigated.

According to one aspect of the present invention, there is provided a method of manufacturing a shaped, heat-resistant chocolate product comprising the steps of (i) thoroughly mixing at least the following ingredients, water, 15 to 35% by weight of at least one edible fat, selected from (a) cocoa butter and (b) cocoa butter and at least one other fat, and not less than 40% by weight of sugar, said percentage being based on the total weight of the chocolate product so as to produce an aqueous sugar solution, in which said at least one edible fat is emulsified with the solution (ii) maintaining said at least one edible fat emulsified with the aqueous sugar solution, evaporating sufficient water from the solution to prevent separation of said at least one edible fat from the said aqueous sugar solution, (iii) shaping the resultant evaporated mixture and drying the shaped mixture so as to produce a shaped heat-resistant chocolate product having a moisture content of not more than 5% by weight and such that individual particles of said at least one edible fat are encapsulated in a sugar glass.

Preferably, a permitted emulsifier is included in the solution and is used in amounts in which emulsifiers are normally used e.g. up to about 1% by weight of the aqueous solution.

The drying step is preferably effected to give a moisture content of not more than 2% by weight.

The amount of water used in the mixing step is sufficient to enable ready mixing of the ingredients and is preferably greater than about 15% by weight of the mixture. Typically, the water content forms of the order of 20% by weight of the mixture. Very high water contents are not preferred in view of the fact that it is necessary to remove the water subsequently and the use of large proportions of water increases energy consumption at the evaporation stage.

The moisture content after the evaporation step is typically of the order of 10% by weight. However, the moisture content at this stage can be varied depending upon whether the fat chosen is one which is or is not maintained readily in emulsion.

Preferably, said at least one edible fat is cocoa butter. However, it is within the scope of the present invention to employ any edible animal or vegetable fat as a partial or full replacement of cocoa butter. For example, hardened palm kernel oil or a cocoa butter replacement fat, e.g. as disclosed in "Chocolate, Cocoa and Confectionery: Science and Technology" by Bernard W. Minifie, 1970, may be employed.

When the chocolate product does not incorporate non-fat cocoa solids, a white chocolate is produced. For a chocolate product which is not a white chocolate, the cocoa solids are included with the water, sugar, and edible fat. For a chocolate product which is milk chocolate, milk solids are included with the water, sugar, edible fat, cocoa solids and emulsifier.

The present invention is applicable to any chocolate product, and the ranges of the ingredients present in the chocolate product may be limited only by the prevailing regulations in a particular country concerning the sale in that country of designated chocolate products whether such products be sold as "chocolate", "plain chocolate", "milk chocolate", or "white chocolate". For example, under E.E.C. regulations, for the chocolate product to be sold as chocolate it must be formed from cocoa nib, cocoa mass, cocoa powder or fat-reduced cocoa powder and sucrose with or without added cocoa butter and have a minimum total dry solids content of 35% and at least 14% of dry non-fat cocoa solids and 18% of cocoa butter not counting any other permitted additives such as permitted flavorings and emulsifier (lecithin). Also, under E.E.C. regulations, for a chocolate product to be designated a milk chocolate, it must contain at least 25% fat and, even when fat reduced cocoa powder is employed, at least 8% of this fat must be cocoa butter. Preferably, however, the cocoa butter content is at least 14.7%.

The above-described process differs from processes which have been used previously to produce milk crumb for milk chocolate manufacture in that such milk crumb production processes avoid "locking" of the fat (milk solids and cocoa butter) in the sugar phase whereas the process of the present invention seeks to provide just such a locking of the fat (cocoa butter and milk fat, if used) in the sugar phase to impart a heat resistance to the chocolate product.

The chocolate product may be produced in an expanded form by gasifying the shaped mixture — the dried residue, or by flash heating, preferably under reduced pressure, said residue in order to effect the drying step, or by a combination of the two aforementioned steps. In an expanded form, the product may have a density as little as 0.2 - 0.3 grams/cc (conventionally produced, unexpanded chocolate, for example, typically has a density of approximately 1.2 grams/cc).

Advantageously, the drying step is effected by injecting the residue through at least one injection nozzle onto a supporting surface in a vacuum chamber.

Conveniently, the supporting surface is provided by a conveyor which conveys the injected material from a heated zone in the vacuum chamber to a cooler, solidification zone in the vacuum chamber.

The residue may be injected continuously onto the moving conveyor so as to produce at least one continuous length of the emulsified residue to be dried, the continuous length being cut to the desired length in the vacuum chamber before being discharged therefrom.

The chocolate product can be evolved with a conventional chocolate or other coating. Thus, an initial "conventional chocolate texture" can be attained when the product is first put in the mouth by utilising a chocolate product provided with a conventional chocolate enrobing.

In a chocolate product produced by the method of the invention, there is little chance of fat seepage until temperatures which are sufficiently high to melt the sugar glass itself are encountered (e.g. temperatures in the region of 160° to 180° F).

With such a chocolate product, a fat determination using a fat solvent extraction technique on an uncominuted sample reveals a substantially zero or very low fat content in spite of the presence of at least 15% fat. This demonstrates that the fat is locked into the sugar glass and is not free to seep out of the product at elevated ambient temperatures.

Because of its relative heat stability in spite of the high fat content, a chocolate product according to the invention can be sold in the form of relatively thin pieces which, if formed of conventional chocolate with a similar fat content, would melt extremely readily when handled. It is thus possible, with a chocolate product according to the invention, to sell a package containing a number of thin pieces or wafers which, although not individually wrapped, will not adhere to one another within the package and which can be eaten as a pleasant alternative to potato chips or the like. This is a surprising property of the composition bearing in mind the high fat content of the composition.

Embodiments of the present invention will now be described in the following examples:

EXAMPLE 1

The chocolate ingredients as set out in the table below were dispersed in water at a temperature of substantially 100° F.

TABLE

| INGREDIENTS | PERCENTAGE BY WEIGHT |
| --- | --- |
| Full cream milk solids | 28.2 |
| Sucrose | 32.7 |
| Cocoa solids (fat free) | 4.0 |
| Cocoa butter | 13.5 |
| Lecithin (Emulsifier) | 0.4 |
| Water (including moisture content of above ingredients) | 21.2 |

An aqueous sugar solution resulted which contained the full cream milk solids, cocoa solids, cocoa butter and emulsifier. This mixture was then passed into a high speed turbine mixer (alternatively a milk homogeniser could be used) whereby the full cream milk solids, cocoa solids, and cocoa butter were emulsified with the aqueous sugar solution for 5 minutes. The resultant emulsion was then pumped to a wiper film vacuum evaporator operating at 306 r.p.m., 10 ins. of mercury, and a temperature of 180°-185° F. In the evaporator, the material was maintained in emulsion and the moisture content reduced to approximately 10% by weight so that a paste was produced which could not readily de-emulsify. The emulsified paste from the evaporator was then pumped, via a pump which introduced a proportion of air into the paste, into a vacuum band dryer operating at 28-29 ins. of mercury vacuum. The aerated, emulsified paste was fed onto the band dryer through a plurality of injection nozzles, the inlet temperature of the paste being in the region of 150°-180° F. Heated platens were provided in a first zone of the dryer into which the injection nozzles discharged. The injection material was carried by the band along the dryer and past cooling platens in a further stage. As the paste on the band passed along the dryer, expansion thereof took place to produce a cellular material having a density of approximately 0.25 grms per cc. Continuous lengths of the material were produced and cut to size by means of a guillotine in the cooling zone of the band dryer. The material cut to length was discharged from the dryer through an airlock. The milk chocolate product thereby formed contained 35.8% full cream milk solids, 41.5% sucrose, 5% cocoa solids, 17.2% cocoa butter, 0.5% lecithin and only a trace of moisture (Total fat content = 26.1% by weight, total sugar content = 41.5% by weight).

The product was then packed into suitable packs for direct consumption. It was found that the product could withstand temperatures as high as 150° F without any breakdown of the physical structure.

As an alternative, the product could have been transferred to a conventional chocolate enrobing machine and coated with chocolate or other edible coating before packing.

EXAMPLE 2

Example 1 was repeated except that hardened palm kernel oil was used in the place of the cocoa butter to produce an expanded chocolate-like confection which could have been eaten as produced or enrobed with a chocolate, chocolate-like or other coating.

EXAMPLE 3

Example 1 was repeated using ingredients to give an expanded chocolate producing having the following compositions (by weight):

sucrose — 34.9%; glucose solids — 4.9%
whole milk solids — 37.3%; Cocoa butter + CADBURY YN (emulsifier fat) — 16.3%
Non-fat cocoa solids — 4.8%; moisture — 1.8%

The total fat content of the product was 26.1% and the total sugar content was 39.8%. The glucose solids were added to reduce the risk of sugar crystallisation during drying.

EXAMPLE 4

Example 1 was repeated using ingredients to give an expanded plain chocolate product having the following compositions (by weight):

sugar — 65.0%; Non-fat cocoa solids — 14.0%
cocoa butter — 20.5%; lecithin (emulsifier) — 0.5%
moisture — nil
(total fat = 21%; total sugar = 65.0%)

EXAMPLE 5

Example 1 was repeated using ingredients to give an expanded plain chocolate product having the composition (by weight):

sugar — 40.0%; non-fat cocoa solids — 35.0%
cocoa butter — 24.5%; lecithin (emulsifier) — 0.5%
moisture — nil
(total fat = 25.0%; total sugar = 40%)

EXAMPLE 6

Example 1 was repeated using ingredients to give an expanded milk chocolate product having the following composition (by weight):

sugar — 55.0%; non-fat cocoa solids — 2.5%
whole milk solids — 14.0%; cocoa butter — 28.0%
lecithin (emulsifier) — 0.5%; moisture — nil
(total fat = 32%; total sugar = 55%)

EXAMPLE 7

Example 1 was repeated using ingredients to give an expanded milk chocolate product having the following ingredients (by weight):

sugar — 41.0%; non-fat cocoa solids — 10.0%
whole milk solids — 28.0%; cocoa butter — 20.5%
lecithin (emulsifier) — 0.5%; moisture — nil
(total fat = 28%; total sugar = 41.0%)

EXAMPLE 8

Example 1 was repeated using ingredients to give an expanded candy product having the following composition (by weight):

sugar — 56.0%; Non-fat cocoa solids — 5.0%
whole milk solids — 32.0%; cocoa butter (or non-cocoa butter vegetable fat or animal fat or a mixture thereof) — 6.5%; lecithin (emulsifier) — 0.5%; moisture — nil
(total fat = 15%; total sugar = 56.0%)

EXAMPLE 9

Example 1 was repeated using ingredients to give an expanded candy product having the following composition (by weight):

sugar — 54.5%; non-fat cocoa solids — 8.0%
whey solids — 5.7%; cocoa butter (or non-cocoa butter vegetable fat or animal fat or a mixture thereof) — 30.7%;
lecithin (emulsifier) — 1.1%; moisture — nil
(total fat = 31.8%; total sugar = 54.5%)

EXAMPLE 10

Example 1 was repeated using ingredients to give an expanded candy product having the following composition (by weight:

sugar — 41.5%; non-fat cocoa solids — 3.85%;
whole milk solids — 12.0%; non-fat milk solids — 11.1%; cocoa butter (or non-cocoa butter vegetable fat or animal fat or a mixture thereof) — 30.80%; lecithin (emulsifier) — 0.75%; moisture — nil
(total fat = 34.7%; total sugar = 41.5%)

EXAMPLE 11

Example 1 was repeated using ingredients to give an expanded white candy product having the following ingredients (by weight):

sugar — 43.5%; whole milk solids — 21.2%
whey solids — 6.0%; cocoa butter (or non-cocoa butter vegetable fat or animal fat or a mixture thereof) — 28.7%
lecithin (emulsifier) — 0.6%; moisture — nil
(total fat content = 34.6%; total sugar content = 43.5%)

In the above Examples heated platens were used in the vacuum dryer. Instead, the material may be heated by micro-wave energy to improve the efficiency of heat transfer.

A partially expanded product can be obtained without the use of a vaccum dryer by using micro-wave energy alone, the micro-wave energy serving to effect a flash evaporation at the drying stage to produce a partially aerated material having a density of about 0.7–0.8 grams per c.c.

As an alternative to using a pump which introduced a proportion of air into the paste to transfer the emulsified paste from the evaporator to the dryer, a double-screw aerator can be employed to give a rather more positive and accurately controllable incorporation of air into the emulsified paste.

The sugar used in the above Examples can include a proportion of glucose solids or dextrose to inhibit crystallisation of the sugar glass.

In all of the above described examples the edible fat or fats are incorporated into a sugar glass so that a discontinuous fat phase occurs and individual fat particles are separated from one another by the sugar glass structure.

The above-described process of manufacturing an edible composition requires only the mixing of a single mass of ingredients and does not necessitate heat treatment of the product over a long period of time to develop the heat-resistant characteristics.

The process according to the present invention can utilise the same ingredients in the same proportions as are used in conventional chocolate so that the flavor of chocolate produced by the process of the present invention can be made to resemble closely that of conventional chocolate although the texture will be somewhat different.

We claim:

1. A method of manufacturing a shaped heat-resistant chocolate product comprising the steps of (i) thoroughly mixing at least the following ingredients: water, 15 to 35% by weight of at least one edible fat selected from (a) cocoa butter and (b) cocoa butter and at least one other fat, and not less than 40% by weight of sugar, said percentages being based on the total weight of the chocolate product, so as to produce an aqueous sugar solution in which said at least one edible fat is emulsified with the solution, (ii) maintaining said at least one edible fat emulsified with the aqueous sugar solution, evaporating sufficient water from the solution to prevent separation of said at least one edible fat from the said aqueous sugar solution, (iii) shaping the resultant evaporated mixture, and (iv) drying the shaped mixture so as to produce a shaped heat-resistant chocolate product having a moisture content of not more than 5% by weight and such that individual particles of said at least one edible fat are encapsulated in a sugar glass.

2. A method as claimed in claim 1, wherein an emulsifier is included in the solution.

3. A method as claimed in claim 1, wherein the drying step is effected to give a moisture content of not more than 2%.

4. A method as claimed in claim 1, wherein the edible composition is produced in expanded form.

5. A method as claimed in claim 4, wherein the edible composition is produced in expanded form by gasifying said shaped mixture.

6. A method as claimed in claim 4 wherein the edible composition is produced in expanded form by flash heating said shaped mixture in order to effect the drying step.

7. A method as claimed in claim 6, wherein said flash heating is effected under reduced pressure.

8. A method as claimed in claim 1, wherein said drying step is effected by injecting the shaped mixture through at least one injection nozzle onto a supporting surface in a vacuum chamber.

9. A method as claimed in claim 8, wherein the shaped mixture is injected onto a moving conveyor which conveys the injected material from a heated zone in the vacuum chamber to a cooler, solidification zone in the vacuum chamber.

10. A method as claimed in claim 9, wherein the shaped mixture is injected continuously onto the moving conveyor so as to produce at least one continuous length of the emulsified mixture to be dried each continuous length being cut to the desired length in the vacuum chamber before being discharged therefrom.

11. A method as claimed in claim 1, wherein the drying step is effected by heating by micro-wave energy.

* * * * *